US011684061B2

(12) United States Patent
Smith et al.

(10) Patent No.: US 11,684,061 B2
(45) Date of Patent: Jun. 27, 2023

(54) INSECT REPELLANT DEVICE

(71) Applicant: SHOOAWAY PTY LTD, Brisbane (AU)

(72) Inventors: Andrew Smith, Brisbane (AU); Arthur Kassos, Brisbane (AU); Robert Ayala, Brisbane (AU); Stuart Roebig, Brisbane (AU); Andrew Burg, Brisbane (AU)

(73) Assignee: SHOOAWAY PTY LTD, Brisbane (AU)

( * ) Notice: Subject to any disclaimer, the term of this patent is extended or adjusted under 35 U.S.C. 154(b) by 1329 days.

(21) Appl. No.: 16/074,603

(22) PCT Filed: Mar. 3, 2017

(86) PCT No.: PCT/AU2017/050186
§ 371 (c)(1),
(2) Date: Aug. 1, 2018

(87) PCT Pub. No.: WO2017/156572
PCT Pub. Date: Sep. 21, 2017

(65) Prior Publication Data
US 2019/0045773 A1    Feb. 14, 2019

(30) Foreign Application Priority Data
Mar. 18, 2016  (AU) .................... 2016901015

(51) Int. Cl.
*A01M 29/08* (2011.01)
*F04D 29/64* (2006.01)
(Continued)

(52) U.S. Cl.
CPC ............ *A01M 29/08* (2013.01); *A01M 29/06* (2013.01); *F04D 25/08* (2013.01); *F04D 29/60* (2013.01);
(Continued)

(58) Field of Classification Search
CPC ... A01M 29/08; A01M 29/06; A01M 220/012
See application file for complete search history.

(56) References Cited

U.S. PATENT DOCUMENTS

| 5,003,721 A | 4/1991 | Underwood |
| 6,282,833 B1 | 9/2001 | Dashefsky |

(Continued)

FOREIGN PATENT DOCUMENTS

| AU | 2011100135 A4 * | 3/2011 | ............ A01M 29/06 |
| AU | 2011100135 A4 | 3/2011 | |

OTHER PUBLICATIONS

International Search Report and Written Opinion for International Application No. PCT/AU2017/050186 dated Apr. 24, 2017.
(Continued)

*Primary Examiner* — Joshua J Michener
*Assistant Examiner* — Nicole Paige Maccrate
(74) *Attorney, Agent, or Firm* — Dorsey & Whitney LLP

(57) ABSTRACT

The present invention relates to an insect repellant device. The device includes a repellant for repelling insects and a motor for driving the repellant. A coupler is provided for coupling the motor to a bottle. Advantageously, the coupler may be coupled to an existing bottle, such as a wine bottle, on a crowded table thereby occupying no additional room on the table.

14 Claims, 1 Drawing Sheet

(51) Int. Cl.
 *A01M 29/06* (2011.01)
 *F04D 25/08* (2006.01)
 *F04D 29/60* (2006.01)
(52) U.S. Cl.
 CPC ..... *A01M 2200/012* (2013.01); *F04D 29/646* (2013.01)

(56) References Cited

U.S. PATENT DOCUMENTS

| | | | |
|---|---|---|---|
| 7,775,848 B1* | 8/2010 | Auerbach | A23G 3/563 446/73 |
| 2011/0083359 A1 | 4/2011 | Gargiulo | |
| 2012/0275940 A1* | 11/2012 | Wark | F04D 29/601 417/410.1 |
| 2013/0067798 A1 | 3/2013 | Keltner | |
| 2014/0205479 A1 | 7/2014 | Wark | |

OTHER PUBLICATIONS

International Preliminary Report on Patentability for International Application No. PCT/AU2017/050186 dated May 8, 2017.

\* cited by examiner

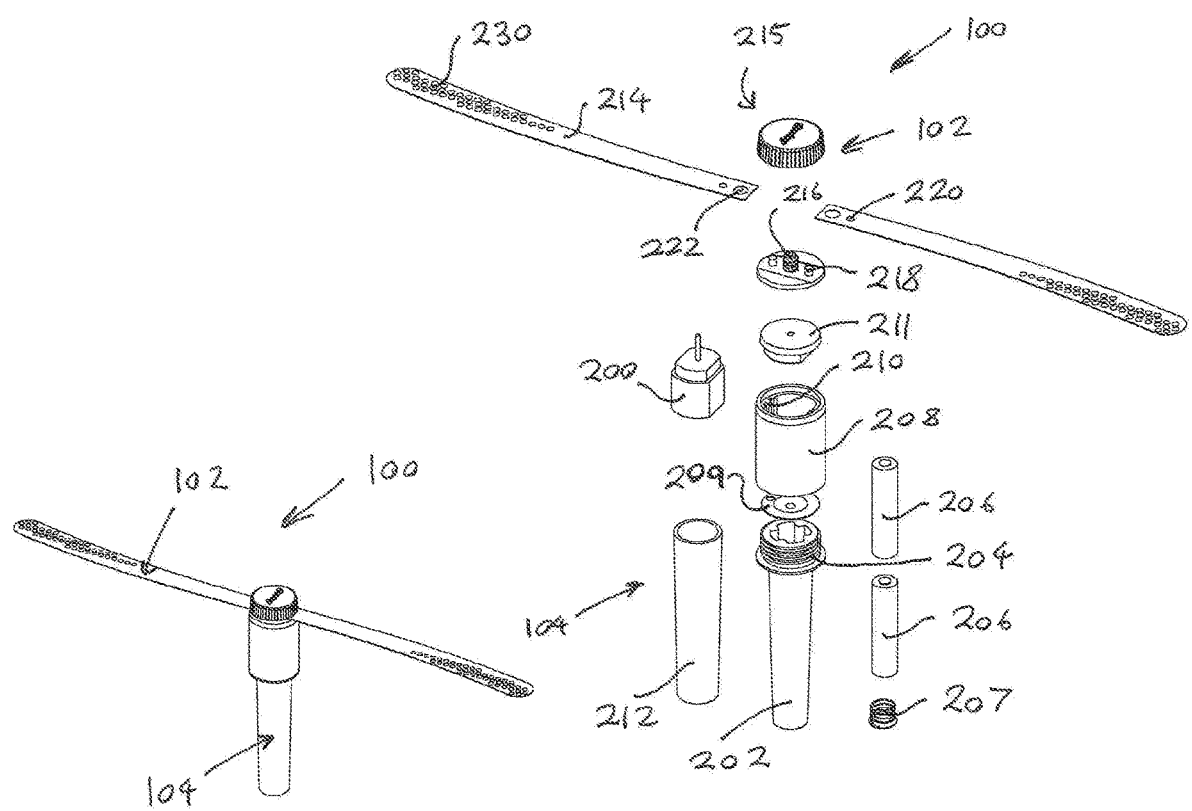

INSECT REPELLANT DEVICE

TECHNICAL FIELD

The present invention relates to an insect repellant device for repelling insects such as flies.

BACKGROUND

The reference to any prior art in this specification is not, and should not be taken as an acknowledgement or any form of suggestion that the prior art forms part of the common general knowledge.

Chemical repellents have been traditionally used to repel insects such as flies. However, such chemical repellants can produce an unpleasant odor, and irritate the skin and eyes of the wearer.

AU 2011 100 135 discloses an insect repellent device which alleviates the forgoing problem. The device includes a stable base for resting on a table, and an upper propeller repellant which rotates to repel insects. Whilst highly effective, the Applicant has perceived that there is often little room to place the base on a crowded table when entertaining.

The preferred embodiment provides an alternative insect repellent device which occupies less room on a crowded table.

SUMMARY OF THE INVENTION

According to one aspect of the present invention, there is provided an insect repellant device including:

a repellant for repelling insects, the repellant including a repeller rotating around an upright axis in use;

a motor for driving the repellant; and a bottle coupler for coupling the motor to a bottle;

wherein the coupler includes a tapered stem for ready linear insertion and removal from a mouth of the bottle, and wherein the stem has an enlarged head to abut the top of the bottle.

Advantageously, the coupler may be coupled to an existing bottle, such as a wine bottle, on a crowded table thereby occupying no additional room on the table.

The coupler may include a stem for ready linear insertion and removal from a mouth of the bottle. The stem may be tapered. The stem may have an enlarged head to abut the top of the bottle. The stem may be hollow to accommodate one or more batteries. The coupler may include a seat in which the motor is seated. The seat may releasably engage with the stem. The coupler may include an adaptor for adapting the stem to snugly fit inside the bottle.

The repellant may include a propeller. The propeller may include one or more blades, and a retainer for retaining the blades. The blades may be flexible. The retainer may include a coupling means for coupling to the motor. The retainer may include a pair of posts for extending through the blades. The retainer may include a cap for receiving the posts and spindle. The repellant may include reflective material which reflects light to repel insects.

The motor may be an electric motor. The device may include a rotational switch to actuate the motor.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1 is an upper perspective view of an insect repellant device in accordance with an embodiment of the present invention; and FIG. 2 is an exploded view of the insect repellant device of FIG. 1.

DETAILED DESCRIPTION OF PREFERRED EMBODIMENTS

According to an embodiment of the present invention, there is provided an insect repellant device 100 as shown in FIG. 1. The device 100 includes a moving propeller repellant 102 for repelling insects, and an internal motor 200 for driving the repellant 102. A coupler 104 is provided for coupling the motor 200 to a bottle (not shown). Advantageously, the coupler 104 can be coupled to an existing bottle on the table, such as a wine bottle, thereby occupying no additional room on a crowded table.

Turning to FIG. 2, the coupler 104 includes a tapered stem 202 for ready linear insertion and removal from a mouth of the bottle. The stem 202 has an enlarged stopper head 204 to abut the top of the bottle. The stem 202 is hollow to accommodate two batteries 206 that power the motor 200 and a conductive base spring 207. The coupler 104 includes a seat 208 in which the motor 200 is seated. The seat 208 can threadably engage with a free end of the stem 202 when the batteries 206 are in the stem 202 to provide electrical connection between the batteries 206 and the motor 200. via conductive plate 209. Internal ribs 210 impede turning of the motor body in the seat 208. A motor retainer 211 is also provided for retaining the motor 200 in the seat 208 and through which a shaft of the motor 200 can pass. The coupler 104 can also include a tubular adaptor 212 for receiving and adapting the stem 202 to snugly fit inside bottles with wider mouths.

The propeller repellant 102 includes a pair of flexible blades 214, and a two-part hub retainer 215 for retaining the blades 214. The retainer 215 includes a central axle 216 for coupling to a shaft of the electric motor 200. The retainer 215 also includes a pair of posts 218 for extending through holes 220 in the blades 214. The spindle 216 passes through other holes 222 in the blades 214. The retainer 215 includes a cap 224 for receiving the posts 218 and spindle 216 to secure the blades 214. The repellant 102 includes, or is formed from, reflective material 230 which reflects light to repel insects.

A switch is provided for switching power from the batteries 206 to the motor 200 which causes the propeller repellant 102 to rotate relative to the static coupler 104. The switch is formed by the rotating seat 208.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. An insect repellant device, comprising:
    a repellant configured for repelling insects, the repellant including a repeller configured for rotating around an upright axis in use;
    a motor configured for driving the repellant; and
    a bottle coupler configured for coupling the motor to a bottle;
    wherein the bottle coupler includes a tapered stem for ready linear insertion and removal from a mouth of the bottle, and
    wherein the tapered stem has an enlarged head to abut the top of the bottle,
    wherein the tapered stem is elongated along the upright axis, and wherein in use, the upright axis is collinear with a vertical axis of the bottle and the motor is coupled to the bottle.

2. The insect repellant device as claimed in claim 1, wherein the repeller includes one or more blades, and a retainer configured for retaining the one or more blades.

3. The insect repellant device as claimed in claim 2, wherein the retainer includes a pair of posts that extend through the one or more blades.

4. The insect repellant device as claimed in claim 1, wherein the coupler is coupled to a wine bottle on a table, thereby occupying no additional room on the table.

5. The insect repellant device as claimed in claim 1, wherein the tapered stem is hollow to accommodate one or more batteries.

6. The insect repellant device as claimed in claim 3, wherein the retainer includes a cap that receives the pair of posts and a spindle.

7. The insect repellant device as claimed in claim 1, wherein the bottle coupler includes a seat in which the motor is seated.

8. The insect repellant device as claimed in claim 7, wherein the seat releasably engages with the tapered stem.

9. The insect repellant device as claimed in claim 1, wherein the bottle coupler includes an adaptor for adapting the tapered stem to snugly fit inside the bottle.

10. The insect repellant device as claimed in claim 2, wherein the retainer includes a coupler configured for coupling to the motor.

11. The insect repellant device as claimed in claim 2, wherein the one or more blades are flexible.

12. The insect repellant device as claimed in claim 1, wherein the repellant includes reflective material, which reflects is configured to reflect light to repel the insects.

13. The insect repellant device as claimed in claim 1, wherein the motor is an electric motor.

14. The insect repellant device as claimed in claim 1, further comprising a rotational switch to actuate the motor.

* * * * *